Patented Mar. 28, 1939

2,152,163

UNITED STATES PATENT OFFICE 2,152,163

PURIFICATION OF SALTS OF ALIPHATIC ACID ESTERS OF POLYBASIC INORGANIC ACIDS

Anton Johan Tulleners, Amsterdam, Netherlands, assignor to Shell Development Company, San Francisco, Calif., a corporation of Delaware No Drawing. Application September 27, 1937, Serial No. 165,903. In the Netherlands October 10, 1936

9 Claims. (Cl. 260—459)

This invention relates to the production and purification of salts of aliphatic acid esters of polybasic inorganic acids and deals particularly with an improved procedure for removing inorganic salt impurities from such salts of aliphatic acid esters.

The primary object of my invention is the provision of a simple extraction procedure whereby pure or substantially pure salts of aliphatic acid esters of polybasic inorganic acids having at least six carbon atoms in the molecule may be prepared from mixtures containing such salts besides inorganic salts.

The extraction process of my invention essentially comprises contacting the salt mixture to be purified with an oxygenated organic solvent for the aliphatic acid ester salt content which solvent has at least six carbon atoms in the molecule. Such organic solvents are non-solvents for inorganic salts and permit the ready separation of such impurities with minimum loss of valuable salts of aliphatic acid esters of polybasic inorganic acids. Due to the high water solubility of the lower aliphatic acid ester salts of polybasic inorganic acids, only those which may be conceived of as being derived from alkenes or alcohols having at least six carbon atoms in the molecule are suitable subjects for purification by the process of my invention.

For the purpose of making my invention more clear it will be described in detail with reference to the purification of alkali metal salts of acid sulfuric acid alkyl esters. It will be understood that this implies no limitation on the process of my invention, however, as alkaline-earth metal, or other metal salts, such, for example, as copper, mercury, zinc, lead, iron and like salts, of the same or other acid esters of polybasic inorganic acids, including, for example, the mono- and/or di-esters of phosphoric acid and the like may be purified in an analogous manner.

In the manufacture of alkali metal salts of acid sulfuric acid alkyl esters it is customary to neutralize absorption products of hexylene and/or higher olefines in sulfuric acid or sulfonation products of hexyl and/or higher alcohols, with alkali. Altho the reaction products may have been washed before such neutralization in an effort to remove unreacted sulfuric acid, it is impractical thus to remove the free sulfuric acid completely. As a result the neutralization products always contains substantial amounts of alkali metal sulfates. For many uses to which alkali metal salts of acid sulfuric acid alkyl esters are particularly adapted the presence of alkali metal sulfate impurities in even relatively small amounts is very undesirable. Prior efforts to remove such inorganic salt impurities have been unsatisfactory due to emulsification difficulties, loss of valuable ester salts, incomplete removal of inorganic salt impurities, etc.

I have found that by extracting impure salts of aliphatic acid esters of polybasic inorganic acids containing inorganic salts with alcohols, phenols, ketones or like oxygenated organic solvents containing six or more carbon atoms to the molecule, the difficulties previously encountered in purification may be overcome and the salts of the aliphatic acid esters may be readily separated off in solution in solvents of this type leaving the undesirable inorganic salts as a residue in which there is no material loss of product. Not only is an exceptionally pure product thus obtained without substantial loss but operating difficulties are eliminated and the separation so simplified that efficient continuous countercurrent operation is rendered practical.

Oxygenated organic solvents which may be successfully used in the process of my invention include, for example, primary, secondary and/or tertiary aliphatic alcohols of six or more carbon atoms, either of a straight or branched chain structure, and including both saturated and unsaturated alcohols, such as normal heptyl alcohol, 2-ethyl-n-butyl alcohol, methyl-isoamyl alcohol, di-methyl-n-propyl-carbinol, 2-ethyl-n-hexyl alcohol and the like, or mixtures of such alcohols, such for example, as the mixtures of higher primary and secondary alcohols obtainable by hydrogenation of carbon oxides, or of the secondary and tertiary alcohols obtainable by absorption of olefines of six or more carbon atoms in sulfuric acid and hydrolysis of the resulting absorption products, or the mixed higher alcohols obtainable by controlled oxidation of paraffin hydrocarbons, or the like. Cyclic hydroxy compounds which may be used as solvents include, for example, benzyl alcohol, terpineol, menthol, phenol, cresol, and the like, or mixtures of such compounds, such, for example, as the mixed phenols obtainable from the soda sludge of cracked petroleum distillates and the like, or the mixtures of cyclic alcohols obtainable by hydrogenation of such mixed phenols. Typical ketones which may be used as solvents are methyl-normal butyl ketone, mesityl oxide, dibutyl ketone, phorone, acetophenone, and the like, and mixtures of such ketones. Instead of the listed oxygenated organic solvents suitable substitution products, such as those containing halogen or alkoxy groups or the like may be used.

A special advantage of the process of the invention is its direct applicability to reaction mixtures in which salts of aliphatic acid esters of polybasic inorganic acids are formed. Evaporation of the neutralized reaction products is thus avoided. In fact, the presence of water, even in small quantities, is advantageous in promoting rapid separation of the inorganic salt impurities, so that when dry salt mixtures are to be purified, I preferably add some water before or during extraction. In such cases, or when the process is applied to a neutralized alkyl acid sulfate reaction mixture, two liquid layers are obtained. One, more usually the upper layer, is a solution of the alkali metal alkyl sulfate in the alcohol, phenol or ketone, or the like, used as the oxygenated organic solvent, while the other is an aqueous solution of alkali metal sulfate or other water soluble inorganic salt impurities.

The process is preferably carried out at an elevated temperature as the dissolving power of the solvents is thereby increased and the separation of the layers is more easily effected. Either batch, intermittent or continuous operation may be used, countercurrent extraction methods being generally preferred. The process may be applied for the removal of inorganic salts present as impurities acquired either during preparation or in use of salts of aliphatic acid esters of polybasic inorganic acids. In the former case, the process is most advantageously applied to neutralization products prepared from alkyl acid esters which have been treated in accordance with United States Patent 2,078,516 for the partial removal of free inorganic polybasic acid.

For certain uses, such for example as in the manufacture of heavy metal salts, such as copper salts, of acid alkyl sulfates for use as insecticides as described and claimed in the copending application of Limburg, Serial Number 153,199, filed July 12, 1937, the extract phase comprising a solution of a salt of an aliphatic acid ester of a polybasic inorganic acid in an oxygenated organic solvent of at least six carbon atoms per molecule, may be used without further treatment. Where the intended use of the salt of the aliphatic acid ester of the polybasic inorganic acid requires removal of the solvent, several different procedures are available. Distillation may be used, either with or without steam or under vacuum. The extract phase may be extracted, for example, with pentane or the like, or other suitable methods may be applied. Where organic impurities such as hydrocarbons, polymers, etc., are also present they may be removed by extracting the salts of aliphatic acid esters of polybasic inorganic acids with a hydrocarbon in the presence of a water soluble low boiling oxy-compound as described in my copending application Serial No. 115,563, filed December 12, 1936, either before, or more preferably after, treatment by the process of the present invention.

The following examples illustrating typical applications of the process of my invention as applied to the manufacture of alkali metal salts of acid alkyl sulfates, show in somewhat more detail how the process may be applied and make clear the efficiency of the method.

*Example I*

An absorption product of a $C_{13}$–$C_{18}$ alkene fraction in sulfuric acid of 90% concentration, treated with caustic soda lye and diluted with water, yielded a solution containing 10.7% by weight sodium alkyl sulfate, 6.6% by weight so-called polymer and 1.6% by weight sodium sulfate, a small quantity of free sodium hydroxide and the rest water. 200 parts by weight of this solution were treated at about 100° C. with 100 parts by weight of a mixture consisting of secondary alcohols with 6 to 9 carbon atoms. Two layers were formed, the upper one of which (about 165 parts by weight) had approximately the following composition: 13% by weight sodium alkyl sulfate, 17% by weight water, the rest consisting of $C_6$–$C_9$ alcohols and polymer. The lower layer consisted of a solution of sodium sulfate in water and was practically free from sodium alkyl sulfate.

*Example II*

Cetyl alcohol was sulfated and the sulfation product neutralized, whereby an aqueous solution was produced, containing 15% by weight sodium cetyl sulfate and 5% by weight sodium sulfate. This solution was treated at an elevated temperature with an equal volume of methyl amyl ketone. Two layers were formed, the upper one of which consisted of a solution of sodium cetyl sulfate plus unconverted cetyl alcohol in ketone and some water. The sodium sulfate was found to have dissolved in the aqueous lower layer, which contained practically no sodium cetyl sulfate.

The upper layer was decanted into water to which about 30% ethyl alcohol had been added. The mixture obtained was extracted with gasoline with a boiling range of 60–80° C. From the gasoline extracts collected the gasoline was distilled off. The used ketone was left behind as residue. From the raffinate, consisting of a solution of sodium cetyl sulfate, the latter substance was obtained as a dry product by evaporation.

It will be apparent that the extraction process of my invention offers many advantages, particularly in efficiency of separation and consequently in freedom from losses, over prior methods of removing inorganic salt impurities from salts of aliphatic acid esters of polybasic inorganic acids. It is particularly notable that by its use separation difficulties are overcome, operating procedure simplified, particularly by avoidance of three phase mixtures, and losses of valuable product in the inorganic salt phase completely eliminated. The salt-free products thus obtained, particularly the alkali metal and alkaline-earth metal salts of acid alkyl esters of sulfuric and phosphoric acids are washing and wetting agents and emulsifiers of materially improved characteristics compared with the impure products formerly produced. My invention is not only capable of wide variation with respect to the inorganic salts which may be removed and the oxygenated organic solvents which may be used but also the operating details may be greatly varied. For example, it will be evident that centrifugal separation may be used for separating the inorganic salt impurity containing phase from the oxygenated organic solvent solution of the aliphatic acid ester salt being purified instead of the stratification and decantation methods previously described and that centrifugal pumps, paddle agitated mixing drums, and the like, may be used for contacting the acid ester salt with the chosen solvent. Furthermore, it will be clear that instead of the alcohols, ketones and phenols of six or more carbon atoms per molecule described as suitable solvents, other oxygenated organic solvents of six or more carbon atoms, such as aldehydes, carboxylic acids and esters thereof, etc., may be used. Similarly, while the invention has been described with more particular reference to the purification of salts of acid alkyl esters of polybasic inorganic acids having at least six carbon atoms to the molecule, it will be apparent that other similar aliphatic acid esters, such, for example, as those of an aliphatic cyclic nature, may be treated in the same way. It will therefore be clear that my invention is not to be limited to the details of operation described nor by any theory advanced in explanation of the improved results attained, but only by the terms of the accompanying claims in which it is my intention to claim all novelty inherent therein as broadly as possible in view of the prior art.

I claim as my invention:

1. A process for purifying an impure salt of an aliphatic acid ester of a polybasic inorganic acid which salt contains at least six carbon atoms per molecule and is contaminated with an inorganic salt impurity which comprises contacting the impure salt with an oxygenated organic solvent having at least six carbon atoms in the molecule which is a non-emulsifying solvent for the acid ester salt and effecting a separation of the contacted mixture into a phase containing inorganic salt impurity and a phase containing said salt of an acid ester of a polybasic inorganic acid in said oxygenated organic solvent.

2. A process in accordance with claim 1 in which the phase separation is effected at temperature raised substantially above atmospheric but below the boiling point of the contact mixture at the operating pressure.

3. A process for purifying an impure salt of an aliphatic acid ester of a polybasic inorganic acid which salt contains at least six carbon atoms per molecule and is contaminated with an inorganic salt impurity which comprises contacting the impure salt in the presence of water and substantial absence of added hydrocarbons and water soluble organic compounds with an oxygenated organic solvent having at least six carbon atoms in the molecule which is a non-emulsifying solvent for the acid ester salt and effecting a separation of the contacted mixture into an aqueous phase containing inorganic salt impurity and a phase containing said salt of an acid ester of a polybasic inorganic acid in said oxygenated organic solvent.

4. A process for purifying an aqueous neutralized absorption product of an olefine of at least six carbon atoms per molecule in a polybasic inorganic acid containing an inorganic salt impurity which comprises contacting the neutralized absorption product with sufficient of an aliphatic secondary alcohol having at least six carbon atoms in the molecule to cause the formation of two liquid phases, thoroughly mixing the components of the resulting mixture and then effecting a separation of the contacted mixture into an aqueous phase containing said inorganic salt impurity and a phase containing the added higher aliphatic secondary alcohol with the other components of the neutralized absorption product.

5. A process for purifying an alkali metal salt of an aliphatic acid sulfate of at least six carbon atoms per molecule containing an alkali metal sulfate impurity which comprises contacting the alkali metal salt of an aliphatic acid sulfate of at least six carbon atoms per molecule containing said alkali metal sulphate with an oxygenated organic solvent therefor which contains at least six carbon atoms in the molecule and effecting a separation of the contacted mixture at a temperature raised substantially above atmospheric but below the boiling point of the mixture at the operating pressure into a phase containing alkali sulfate impurity and a phase containing a solution of the aliphatic acid sulfate alkali salt in the oxygenated organic solvent.

6. A process for purifying a metal salt of an alkyl acid sulfate having at least six carbon atoms per molecule containing an inorganic salt impurity which comprises contacting the impure alkyl acid sulfate salt in the presence of water with a water insoluble organic hydroxy compound of at least 6 carbon atoms per molecule and effecting a separation of the contacted mixture into an aqueous phase containing said inorganic salt impurity and a phase containing the alkyl acid sulfate salt and said organic hydroxy compound.

7. A process for purifying a metal salt of an alkyl acid sulfate having at least six carbon atoms per molecule containing an inorganic salt impurity which comprises contacting the impure alkyl acid sulfate salt with a monohydroxy alcohol of at least six carbon atoms per molecule and effecting a separation of the contacted mixture into a phase containing the inorganic salt impurity and a phase containing the alkyl acid sulfate salt and said alcohol.

8. A process for purifying a metal salt of an alkyl acid sulfate having at least six carbon atoms per molecule containing an inorganic salt impurity which comprises contacting the impure alkyl acid sulfate salt with a phenol and effecting a separation of the contacted mixture into a phase containing the inorganic salt impurity and a phase containing the alkyl acid sulfate salt and said phenol.

9. A process for purifying a metal salt of an alkyl acid sulfate having at least six carbon atoms per molecule containing an inorganic salt impurity which comprises contacting the impure alkyl acid sulfate salt with an aliphatic ketone of at least six carbon atoms per molecule and effecting a separation of the contacted mixture into a phase containing the inorganic salt impurity and a phase containing the alkyl acid sulfate salt and said ketone.

ANTON JOHAN TULLENERS.